United States Patent [19]

Toral et al.

[11] Patent Number: 5,086,919

[45] Date of Patent: Feb. 11, 1992

[54] MULTIPLE PACKAGING FOR MAGNETIC TAPES WOUND ON CORES

[75] Inventors: Jose Toral; Hermann Brandstetter; Hartmut Thiele; August Liepold, all of Munich; Leo Gruber, Pentenried, all of Fed. Rep. of Germany

[73] Assignee: BASF Magnetics GmbH, Mannheim, Fed. Rep. of Germany

[21] Appl. No.: 596,475

[22] Filed: Oct. 12, 1990

[30] Foreign Application Priority Data

Oct. 27, 1989 [DE] Fed. Rep. of Germany ... 8912747[U]
Oct. 27, 1989 [DE] Fed. Rep. of Germany ... 8912749[U]

[51] Int. Cl.⁵ ............................................. B65D 85/671
[52] U.S. Cl. ..................................... 206/303; 206/394; 206/410
[58] Field of Search ........................... 206/389–417, 206/53–55, 444, 303

[56] References Cited

U.S. PATENT DOCUMENTS

| | | | |
|---|---|---|---|
| 3,685,646 | 8/1972 | Sy | 206/408 |
| 3,756,392 | 8/1973 | Oehlmann | 206/407 |
| 4,120,398 | 10/1978 | Braddon, Sr. | 206/408 |
| 4,491,222 | 1/1985 | Gaccetta et al. | 206/413 |
| 4,708,246 | 11/1987 | Minion | 206/416 |
| 4,792,044 | 12/1988 | Nishizawa et al. | 206/413 |
| 4,883,178 | 11/1989 | Thiele et al. | 206/416 |
| 4,955,471 | 9/1990 | Hirose et al. | 206/411 |
| 4,988,001 | 1/1991 | Brandstetter et al. | 206/415 |

FOREIGN PATENT DOCUMENTS 0332185  9/1989  European Pat. Off. ............ 206/389

Primary Examiner—Jimmy G. Foster
Attorney, Agent, or Firm—Connolly and Hutz

[57] ABSTRACT

A novel packaging for several tape-form recording media (5) wound on reel cores (6) or spools provided with internal bores consists of two pallets (1, 2) and optionally hubs (3) which are raised in the axial center (10) and of which the diameter corresponds to the clear internal diameter of the bores of the reel cores (6). The packaging can be sealed by a shrink film (4) which can be pulled thereover. The cuboid pallets (1, 2) which can be joined together have groove-like notches (7) at their edges, the interior of the pallets reproduces the outer shape of the pancakes (5) and the weld seam (8) of the shrink film (4) is formed in one of the notches (7). The pallets (1, 2) also have window-like cutouts (9) on their four narrow sides. Pallets as well as the hub (3) passing through the axial center (10) of the pancakes are preferably composed of Styropore (FIG. 1).

7 Claims, 4 Drawing Sheets

MULTIPLE PACKAGING FOR MAGNETIC TAPES WOUND ON CORES

FIELD OF THE INVENTION

The invention relates to a packaging for several tape-form recording media wound on reel cores or spools provided with internal bores, the packaging consisting of plastics pallets and optionally hubs which are raised in the axial centre and of which the diameter corresponds to the clear internal diameter of the bores in the reel cores and wherein the packaging can be sealed by a shrink film which can be pulled thereover.

BACKGROUND OF THE INVENTION

So-called crude article packagings are sold worldwide from magnetic tape factories. In these packagings, the magnetic tape is wound onto cores, for example flangeless reel cores (either the so-called NAB cores or stackable reel cores according to U.S. 4,081,151 or others). These so-called pancakes are currently either packed individually or shrunk in collective bundles or held by various cardboard boxes. Such a packaging is known from GB 157 6973.

The disadvantage of the collective packaging mentioned above is that the magnetic tapes are not optimally protected even though the outer layers are protected by Styropore boards and the stacked pancakes are also sealed by a shrink film. The following defects can arise during storage or transportation:

Owing to the shrunk packaging, the outer edges are under tension and exert a pressure on the magnetic tapes contained therein so the reels of magnetic tape can be subjected to plate-shaped deformation.

During horizontal transportation, in other words when the reel of tape or reel core is lying horizontally, step formation or slipping of the reels can occur and thus damage the magnetic tape.

Collective packagings of the above-mentioned generic type are known from EP 0 320 751, in which re-usable core supports which can be secured or screwed in place help to avoid the above-mentioned disadvantages. However, this requires a plurality of parts with the resultant price drawbacks for this type of packaging.

A collective packaging for pancakes is known from U.S. 4,708,246, in which the intermediate layers between the pancakes are adapted to the shape thereof. However, this entails high consumption of packaging material. A collective packaging for stacked fragile articles according to U.S. Pat. No. 2,776,772 has similar disadvantages.

A packaging of the same generic type is known from DE-GM 89 00 709, in which the internal faces of the polygonal pallets are conically tapered in the region of the reel of tape such that the reels of tape lie uniformly on the pallets when the packaging is shrunk. This method of packaging also has the disadvantages that it does not confer adequate strength when combined to form several bundles for transportation, that the pancakes inside are insufficiently protected by the shrink film and that the weld point of the shrink film can damage the packaging and the contents. Furthermore, most of the above-mentioned packagings have the disadvantage that they can only be picked up and set down manually.

SUMMARY OF THE INVENTION

The object therefore arose of finding a collective packaging which does not have the above-mentioned disadvantages but guarantees optimum protection of the pancakes, can be used as universally as possible and allows the inexpensive and compact transportation of packagings, even in the cases of relatively large diameter pancakes and of spools of magnetic tape.

A further object was to find a collective packaging which can be used several times.

According to the invention, the object has been achieved with a packaging having the features as follows. A package of several recording media in tape wound on reel cores or spools which have internal bores in which cuboid plastic pallets containing the tape wound cores and the package is sealed by a shrink film drawn over the pallets and the cores. The pallets have groove-like notches on their periphery and the interior surface of the pallets are formed to conform with the external shape of the tape-wound cores contained therein. The shrink film has a weld seam closing the film over the package, which weld seam is formed in a notch. One or both pallets may be formed with an axial hub raised in the axial center of the pallets. The axial hub has a diameter corresponding to the internal diameter corresponding to the internal diameter of the bore of the real cores. Further details of the invention are given in the description and the drawings. The invention is described in more detail below with reference to the drawings. Further details of the invention are given in the description and the drawings. The invention is described in more detail below with reference to the drawings.

DESCRIPTION OF THE INVENTION

Figure 1:
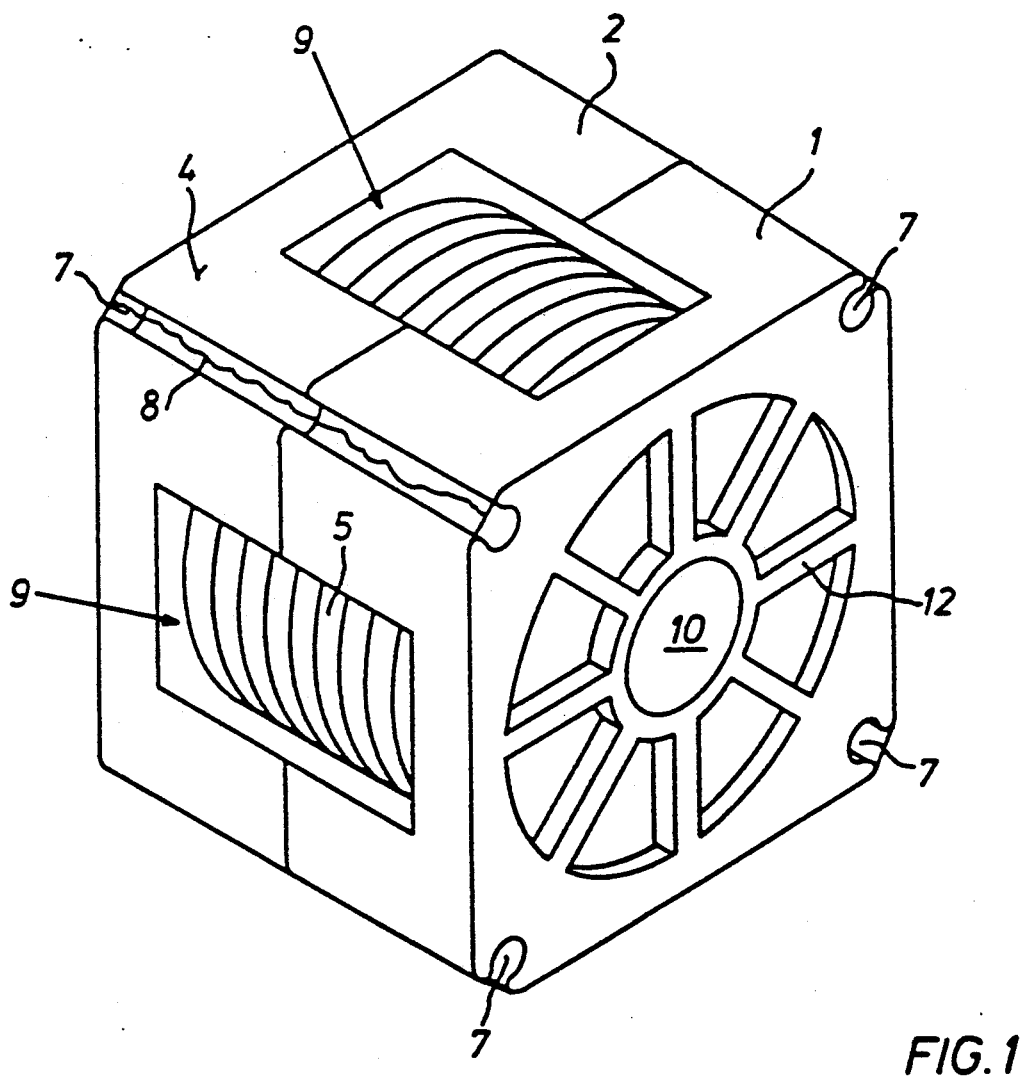
FIG. 1 shows a perspective view of the packaging according to the invention.
Figure 2:
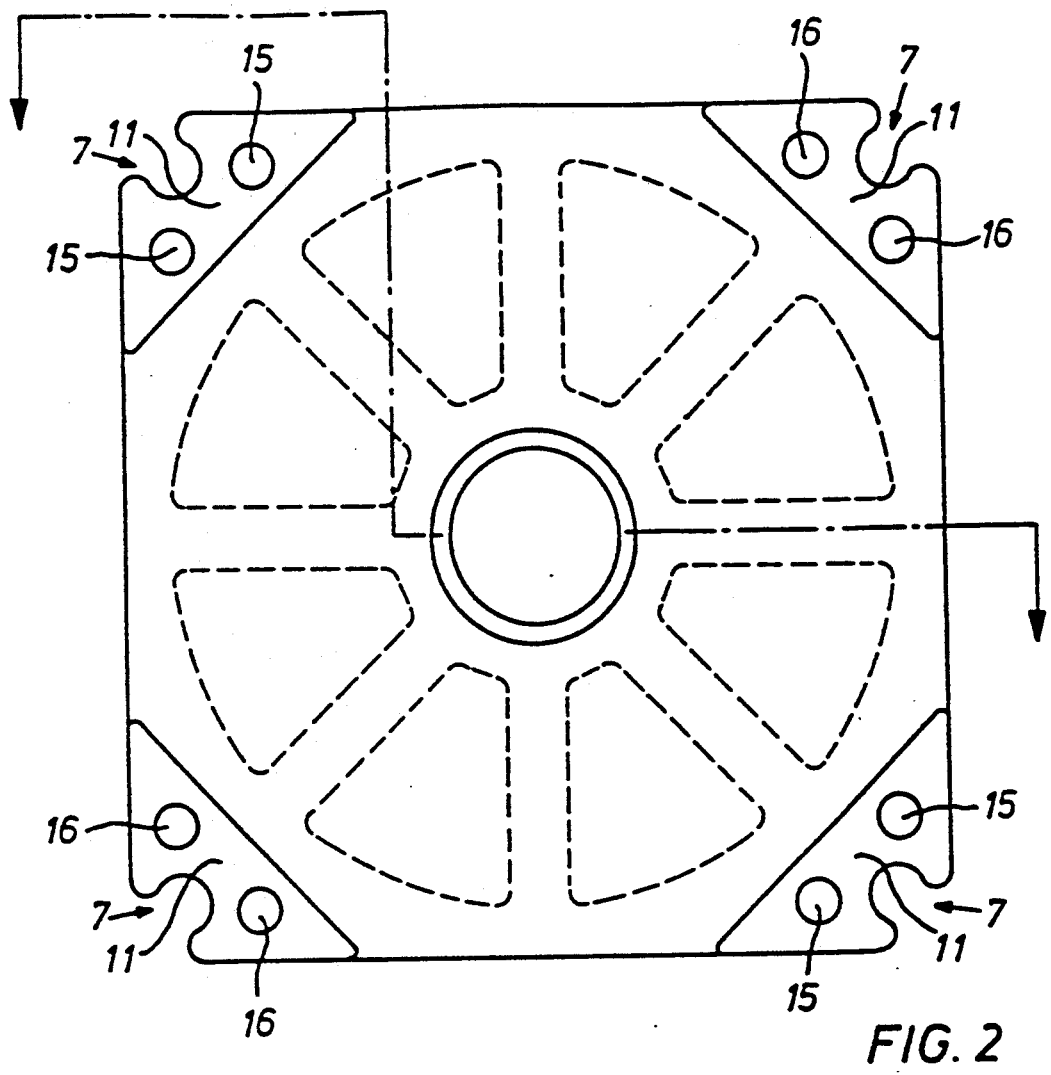
FIG. 2 shows a plan view of the interior of the packaging.
Figure 3:
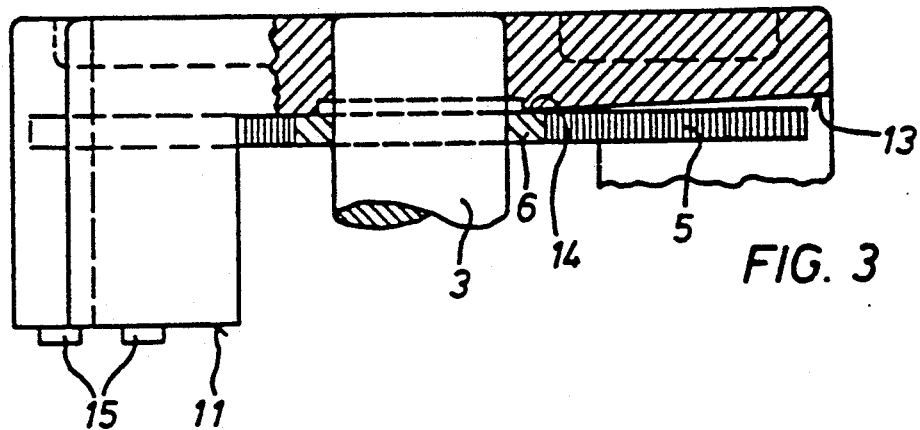
FIG. 3 shows a cross section through a part of the pallet.

The packaging (FIG. 1) consists of two virtually identical cuboid pallets (1, 2) which, in a preferred design, contain, on their narrow sides, cut-outs which, when the two pallet halves are assembled, complement one another to form a window (9). On the external faces of the broad sides, the pallets have material attenuations with spoke-shaped reinforcements (12) therebetween, which emanate from the axial centre (10), as also already known from the prior art. According to FIGS. 2 and 3, the pallets (1, 2) have, at the corners of their internal faces, pegs (15) and associated holes (16) for engagement when the two halves are assembled.

The interior of the pallet (FIG. 2) substantially reproduces the form of the reel of tape, either in the form of a plate with a central support face (14) for the reel cores (6) as in the already mentioned DE 26 55 254 or with contact faces (11) at the corners of the pallet. The support faces (13) of the reels of tape (5) wound onto the reel cores (6) can also taper conically outwards, as in the abovementioned DE-GM 89 00 709 (FIG. 3), in which case the reel of tape rests completely on the support face in the shrunk state of the packaging.

Figure 4:
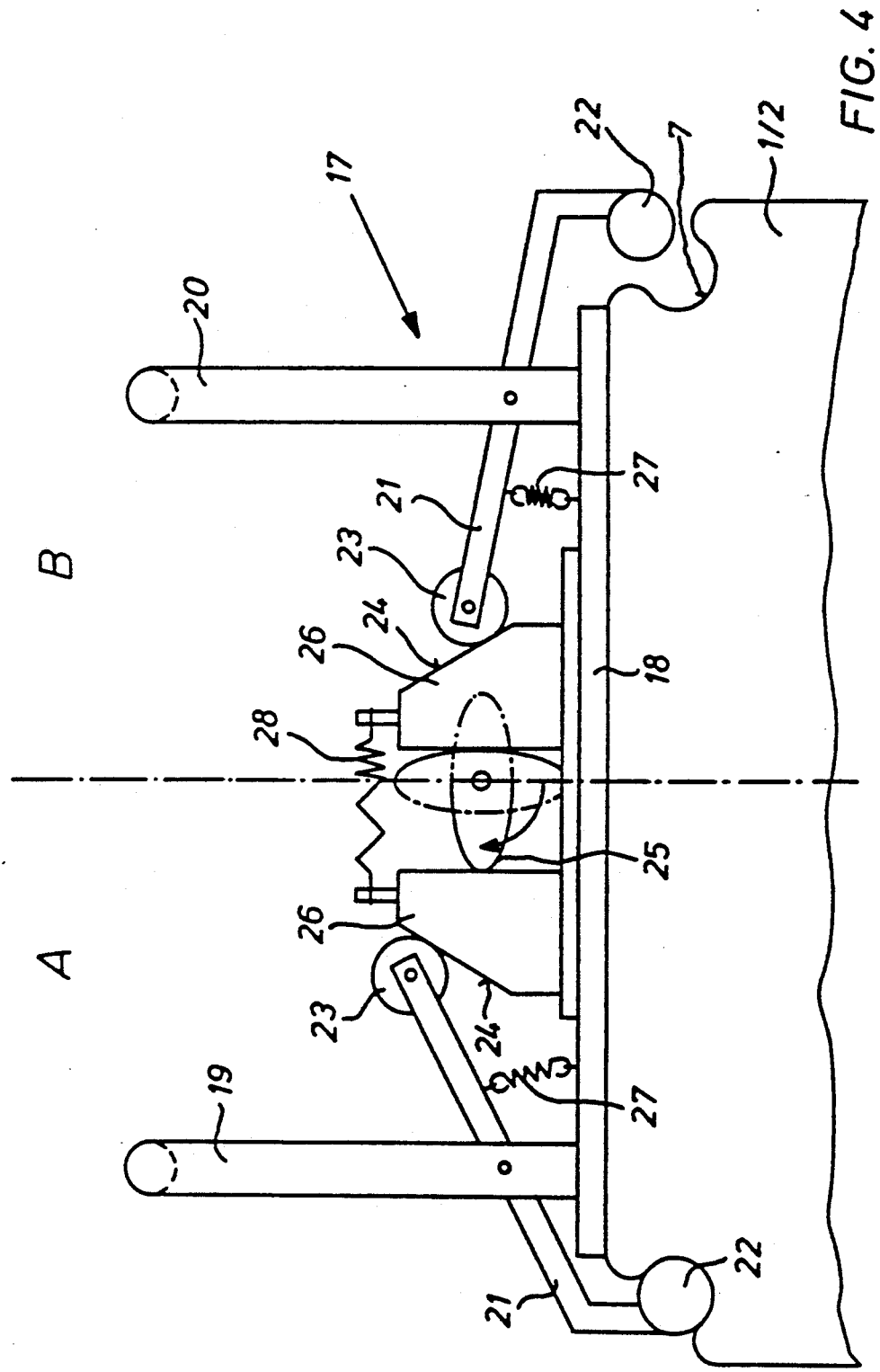
FIG. 4 shows a schematic view of a gripper for the packaging.

An important part of the invention resides in the fact that the pallet has groove-like notches (7) at its outer edges. These have several purposes. On the one hand, the shrink film (4) can be shrunk on after application of the stacked pancakes (5) into a pallet (1), penetration of a core support (3) and closure by the other associated pallet (2). The weld seam (8) of the shrink film rests in one of the notches (7) so as to avoid damaging adjacent packagings when combined in larger bundles for transportation. On the other hand, the notches form recessed handles for lifting the packaging during processing either manually or with a two-armed gripper (17) which engages in two adjacent grooves (7). This gripper is constructed as follows in an advantageous design (FIG. 4). On a plate (18) which is placed on the upper side of the packaging there are located two wedges (26) having an oblique external run-out face (24) and mounted movably in parallel therewith. A roller (23) fixed at the end of a two-armed lever (21) runs on the run-out face (24) in each case, the lever being prestressed in the plate (18) direction by a spring (27). A hooking element (22) engages into the notch (7) of the packaging at the other end of the lever (21). Each of the levers (21) has its axis at a post (19, 20) projecting from the plate (18). These posts are connected either to a recessed handle (not shown) or to a lifting device or the like. The two wedges (26), which are joined together by a spring (28), are actuated by means of a cam (25) either into the setting down position B (to the right) or the engagement position A (to the left) of the gripper (17). The grooves (7) also serve as indexing for automatic filling of the pallets with the pancakes and for ventilation after the film (4) has been shrunk on.

The packaging according to the invention has the further advantages that:

several packaging bundles, for example five, can be stacked on top of one another on a transporting pallet owing to the strong design, and an intermediate layer can optionally be introduced between the individual bundles;

the packaging and transportation even of relatively large pancake diameters (up to 14–16 inches) become possible;

pancakes with reel cores of differing thickness can be used owing to suitable dimensioning of the pallets. For example, 30 pancakes on 4 mm wide reel cores in each case or 8 pancakes on 12 mm wide reel cores in each case can be transported in one packaging so the same packaging can be used for different types. Similarly, magnetic tapes (with widths of half an inch to two inches) which are wound on spools can be packed;

an inexpensive Styropore core is sufficient as a core support (3) in this type of packaging;

the wall thickness of the Styropore can be reduced owing to the strength of the pallets, which is better than that of a packaging according to DE-GM 89 00 809, so a clear saving of space is additionally obtained when combining the packaging bundles;

owing to the method of shrinkage, the packaging according to the invention also has an attractive appearance and allows the inscription on the exteriors of the pancakes to be observed through the window openings on which the shrink film lies smoothly.

Figure 5:
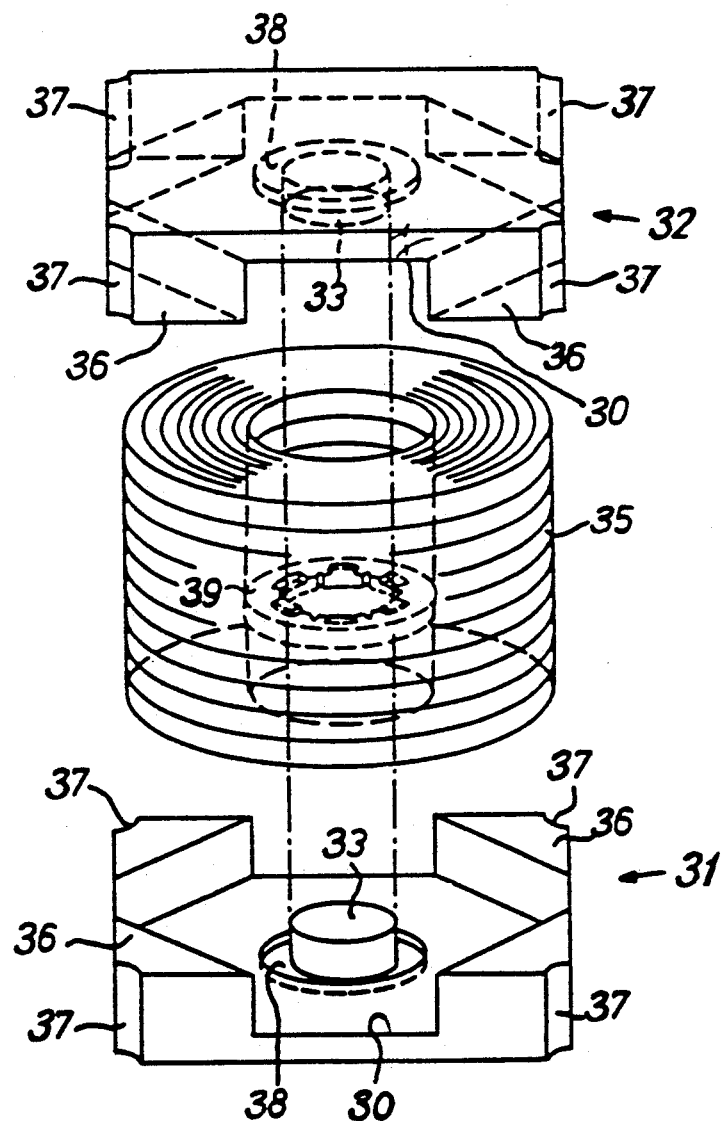
FIG. 5 shows a perspective view of another design according to the invention.

A further design of the invention is described in more detail below with reference to FIG. 5 which shows the packaging in an exploded view. The packaging consists of two substantially identical rectangular flat pallets (31, 32) which have, at their corners, posts (36) which penetrate into the interior of the packaging in each case. These are triangular in construction with a right angle at the corner of the pallet. The corner is preferably provided with a groove (37) over the entire height of the post. A core stub (33) for receiving the reel cores (39) with the recording medium wound thereon is located as hub in the axial centre on the interior of the pallets. The height of the core stub is dimensioned at least as the height of a reel core. The height of the posts (36) is preferably selected such that, with a predetermined number of stacked pancakes (35), the respective superimposed ends of the posts abut against one another when the pallets (31, 32) are put together. As in the design described above, the ends of the posts can be provided with pegs (not shown) and associated holes for joining together the pallets. One or more groove-like impressions (38) for receiving axial deformations of the reel cores, for example according to U.S. Pat. No. 4,081,151, can be provided round the core stub on the interior of the pallet. Window openings (30) are also provided on the sides.

A shrink film (not shown) which is known from the prior art and whose weld seam is placed, according to the invention, in one of the grooves (37) is shrunk round the assembled packaging. A smooth, cuboid packaging which is easy to stack and to transport is obtained in this way. For transportation, the packaging is tilted through 90° so that the pancake reels stand vertically. When removing the packaging for the customer, the grooves simplify handling, for example by means of a two-armed gripper for engaging in the lateral grooves (37), as described in more detail in the foregoing. After removal of the content, the described type of packaging is also suitable for return transport, in an economical manner, in that the upper and lower pallet can be despatched in a compact manner after being mutually offset by 45° and stacked.

The pallet preferably consists of a rigid plastics material such as acrylonitrile/butadiene/styrene copolymer or polypropylene. The strong design described allows several layers of the packagings according to the invention to be stacked on top of one another for despatch or transportation, and only one intermediate layer, for example of cardboard, may be placed between two layers.

What is claimed is:

1. A package of tape-wound reel cores comprising:
  a plurality of recording media consisting of tape-wound reel cores, each having a core with an internal bore and a reel of tape wound about the core
  pallets positioned around said recording media to contain the recording media,
  a shrink film sealed over the pallets and by shrinkage of the film so that the pallets are drawn together,
  groove-like notches at the edges of the pallets,
  a weld seam in the shrink film positioned at one of the notches, closing the film over the pallets and recording media,
  and a face on the interior of the pallet providing a support for a core having a tape wound about it and a support surface on the interior of the pallet for supporting the reel of tape.

2. The package of claim 1 wherein the pallets are cuboid and a pallet has a central core support extending axially and having a diameter interfitting with the diameter of the internal bore of said reel cores.

3. The package of claim 1 wherein the pallets have apertures formed in sides of the pallets.

4. The package of claim 1 wherein the pallets consist of Styropore.

5. The package of claim 1, having two pallets which are rectangular and flat, with corners of said rectangular, flat pallets, right-angled triangular post at said corners so constructed and arranged that the tape-wound reel cores are positioned within said posts, the notches being formed at said corners, a central core post in a pallet having an axial length equal at least to the axial height of a reel core in said package, and the posts of the respective two pallets, abutting each other to contain the recording media.

6. The package of claim 5 wherein the central core post has an impression formed concentrically and a reel has an axial deformation extending into said concentrically formed impression in the post.

7. The package of claim 5 wherein the pallets consists of acrylonitrile/butadiene/styrene copolymer, polypropylene, or a rigid plastic material.

* * * * *